United States Patent Office 2,930,800
Patented Mar. 29, 1960

2,930,800

4-THIANAPHTHENEACETIC ACIDS AND PREPARATION THEREOF

Milton C. Kloetzel, Los Angeles County, and David M. Frisch, Los Angeles, Calif.; said Frisch assignor to said Kloetzel No Drawing. Application October 28, 1954
Serial No. 465,445

18 Claims. (Cl. 260—330.5)

This invention relates to a novel process and to novel products obtainable thereby. More particularly the invention relates to a novel process for producing 4-thianaphtheneacetic acid, to the novel product per se, and novel intermediates produced in the process.

It is well known that certain derivatives of acetic acid, such as 3-indoleacetic acid, 1-napthaleneacetic acid, 1-naphthoxyacetic acid, and 2,4-dichlorophenoxyacetic acid, including the combined forms of these acids, for example, the salts, esters, and amides which are easily converted to the free acid form, are effective plant-growth regulants.

Various of these acetic acid derivatives are useful in stimulating root formation and development, preventing or delaying pre-harvest drop, in regulation of germination either to stimulate or inhibit sprouting, in the production of parthenocarpic or seedless varieties of fruits and berries, and for the control or eradication of unwanted plants or weeds.

It has now been found that 4-thianaphtheneacetic acid (including the combined forms as set forth above) which is produced according to the novel process of the invention, is effective as a plant-growth regulant and is uniquely characterized by combining very high auxin activity as measured in the hypocotyl curvature test [Weintraub, Brown, Throne, and Yeatman, Am. J. Botany 38: 435 (1951)] and little or no formative activity (Molara less than 200) as indicated by the leaf-repression test [Brown and Weintraub, Botan. Gaz. 111: 448 (1950)].

2-thianaptheneacetic acid, melting point 141-2 degrees centigrade, and 3-thianaphtheneacetic acid, melting point 108-9 degrees centigrade, are known in the art [see Blicke and Sheets, J. Am. Chem. Soc. 70: 3768-70 (1948)]. In these compounds, however, the acetic acid group is attached to the thiophene ring whereas in the 4-thianaphtheneacetic acid of the invention, the acetic acid group is attached to the benzene ring. Furthermore, the 2- and 3-thianaphtheneacetic acids have relatively low growth activity as compared with 3-indoleacetic acid and 1-naphthaleneacetic acid [see Crook, Davies and Smith, Nature 139: 154–5 (1937)]. Additionally, the novel 4-thianaphtheneacetic acid of the invention cannot be prepared by the processes utilized in the prior art for producing the 2- and 3-thianaphtheneacetic acids [see also Crook and Davies, J. Chem. Soc. 1937: 1697–8; Avakian, Moss, and Martin, J. Am. Chem. Soc. 70: 3075–6 (1948); Blicke and Sheets, J. Am. Chem. Soc. 71: 2856–9 (1949)]. Furthermore the 3-thianaphtheneacetic acid is reported to be phytotoxic [see Schlesinger and Mowry, J. Am. Chem. Soc. 73; 2614–6 (1951)].

The novel 4-thianaphtheneacetic acid of the invention may be represented by the following general formula:

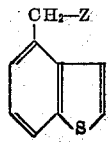

in which Z is selected from the class consisting of carboxyl, lower-esterified carboxyl, lower-amidated carboxyl, neutralized carboxyl and carboxylic acid-halide radicals. Thus not only the free acids but also esters, amides, salts, and acid halides thereof are within the purview of the invention. The thianaphthene nucleus can be substituted, if desired, with halogen, alkyl, or alkoxy groups, e.g., fluorine, chlorine, bromine, iodine, methyl, ethyl, propyl, butyl, methoxy, ethoxy, propoxy, butoxy, and the like.

The novel compounds of the invention are prepared from 6,7-dihydro-4(5)-thianaphthenone [Fieser and Kennelly, J. Am. Chem. Soc. 57: 1611 (1935)], and a haloacetic acid ester by a Reformatzky reaction whereby a mixture of the corresponding esters of $\Delta^{4(5),\alpha}$-6,7-dihydrothianaphtheneacetic acid and 6,7-dihydro-4-thianaphtheneacetic acid is obtained. These esters can be hydrolyzed to the corresponding acids. Both the esters and the acids can be separated and used as such or further processed to produce 4-thianaphtheneacetic acid and esters thereof. On subjecting the mixture of esters, or the individual esters, to dehydrogenation, the corresponding ester of 4-thianaphtheneacetic acid is obtained. The desired 4-thianaphtheneacetic acid is obtained by hydrolysis of its ester or by dehydrogenation of one or both of the intermediate acids (i.e., $\Delta^{4(5),\alpha}$-6,7-dihydrothianaphtheneacetic acid and 6,7-dihydro-4-thianaphtheneacetic acid). Any of the thus-obtained 4-thianaphthenyl derivatives can be oxidized to a sulfone or sulfoxide by means of the procedures known in the art for converting organic sulfides, particularly diaryl sulfides, to sulfoxides and sulfones. See Hickinbottom, "Reactions of Organic Compounds," Longmans, Green, and Co., Ltd., London, 1936 edition, pp. 114 and 115. The process can be represented by the following reactions and general formulas:

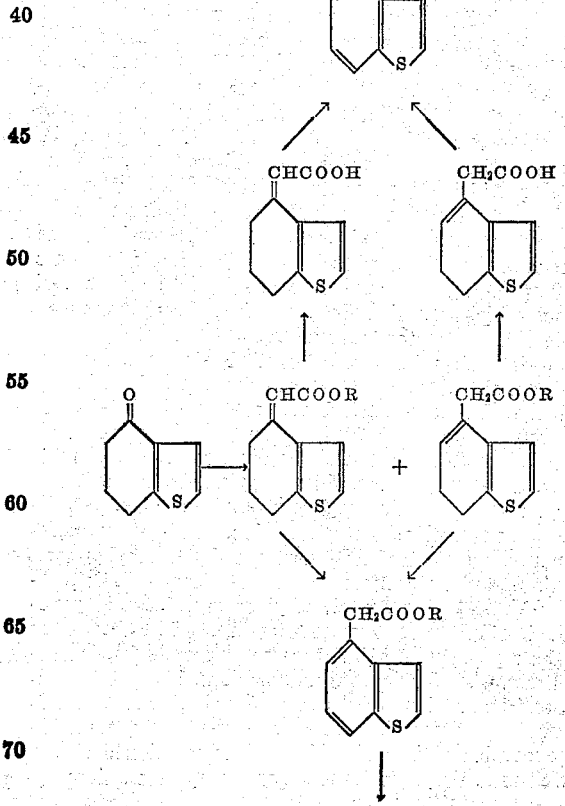

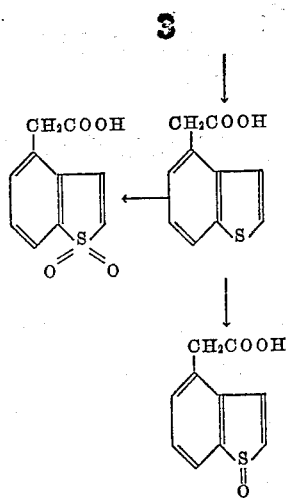

in which R represents the radical of an alcohol, that is, a radical which attached to a hydroxyl group forms an alcohol. Ordinarily R is methyl or ethyl in accordance with the usual practice in the Reformatzky reaction, although R can also be other lower-alkyl radicals, such as n-propyl, isopropyl, n-butyl, sec-butyl, 1-methylbutyl, n-hexyl, 2-ethylhexyl, and the like. R also can be benzyl or like lower-aralkyl radical. R can also be an unsaturated hydrocarbon radical such as allyl, 2-butenyl or like lower-alkenyl radical. Thus, in general, R can be any lower hydrocarbon radical. R can also be the radical of a mono-ether of a glycol or polyalkylene glycol, such as 2-methoxyethyl, 2-ethoxyethyl, 2-butoxyethyl, 2-(2-ethoxyethoxy)ethyl, and like lower-alkoxyalkyl radicals.

Representative haloacetic acid esters which can be employed in the aforesaid Reformatzky reaction include methyl bromoacetate, ethyl chloroacetate, ethyl bromoacetate, ethyl iodoacetate, butyl (n-, sec-, or tert-) bromoacetate, benzyl bromoacetate, propyl (n- or iso-) bromoacetate, and the like. The aforesaid dehydrogenations are advantageously carried out with chloranil, although other dehydrogenating agents can likewise be employed, including other quinones such as benzoquinone, naphthoquinone, and the like, and also including more vigorous dehydrogenating agents such as sulfur and selenium.

The free acids obtained can be converted to amides and esters by the conventional amidation and esterification techniques. Advantageously the acids can be converted to the acid chlorides (or bromides) by reaction with thionyl chloride (or bromide) according to the process well known in the art for this purpose, and the resulting acid halides then reacted with alcohols or ammonia or amines (primary or secondary) to form the desired esters or amides. The amides and esters can also be formed by direct processes using suitable catalysts and/or dehydrating conditions. Suitable alcohols and amines which can thus be utilized to form esters and amides include methanol, ethanol, n-propanol, isopropanol, n-butanol, sec-butanol, 3-methyl-1-butanol, 1-methyl-1-butanol, n-hexanol, 2-ethyl-1-hexanol, 2-methoxy-, 2-ethoxy-, 2-butoxy-, 2-(2-butoxyethoxy)- and 2-(2-ethoxyethoxy)-ethanols, benzyl alcohol and the corresponding primary amines, as well as dimethylamine, diethylamine, di-n-propylamine, diisopropylamine, N-methyl-n-propylamine, piperidine, pipecolines, morpholine, pyrrolidine, ethanolamine, diethanolamine, tris(hydroxymethyl)methylamine, bis[tris(hydroxymethyl)methyl]amine, 2-amino-1-butanol, 2-amino-2-ethyl-1,3-propanediol, 2-amino-2-methyl-1-propanol, ethylene glycol, 2-thiocyanoethanol, ethylenediamine, and the like. The free acids can be reacted with suitable bases to form salts, including lithium, sodium, potassium, calcium, barium, strontium, and ammonium salts, and also including substituted-ammonium salts such as are obtained from organic nitrogenous bases, including the amines mentioned above, as well as tertiary amines and quaternary ammonium hydroxides such as tetramethyl- and tetraethylammonium hydroxide, pyridine, N-methylmorpholine, N-methylpiperidine, trimethylamine, triethylamine, tributylamine, and the like. Many of the above salts and in addition others such as those of magnesium, aluminum, iron, cobalt, nickel, zinc, cadmium, mercury, and copper, can advantageously be prepared metathetically, e.g., by treating an aqueous solution of a soluble salt of the organic acid, such as the sodium salt, with an aqueous solution of an inorganic salt such as magnesium nitrate, nickel chloride, aluminum sulfate, ferric chloride, etc.

The invention may now be more fully understood by reference to the following examples which are to be understood as illustrative only and not limiting.

*Example 1.—Reformatzky reaction of 6,7-dihydro-4(5)-thianaphthenone with ethyl bromoacetate*

To a hot mixture of 48 grams of amalgamated zinc, twelve milliliters of ethyl bromoacetate, 400 milligrams of iodine, 200 milliliters of dry benzene, and 200 milliliters of dry ether, was added sixteen grams of 6,7-dihydro-4(5)-thianaphthenone. While the mixture was refluxed for two hours, 48 grams of amalgamated zinc and 400 milligrams of iodine were added at each half-hour interval. Finally twelve milliliters of ethyl bromoacetate was added and the mixture was refluxed for an additional period of 2.5 hours. The cooled mixture was decomposed with cold ten percent hydrochloric acid and the organic layer, combined with two benzene extracts of the aqueous layer, was washed with dilute ammonia water and finally distilled under reduced pressure. A mixture of isomers, namely, ethyl $\Delta^{4(5),\alpha}$-6,7-dihydrothianaphtheneacetate and ethyl 6,7-dihydro-4-thianaphtheneacetate, distilled at 135–150 degrees centigrade at three millimeters; yield, seventeen grams (73 percent).

*Analysis.*—Calculated for $C_{12}H_{14}O_2S$: C, 64.83; H, 6.34. Found: C, 64.60; H, 6.46.

In place of ethyl bromoacetate in the above example, there can be substituted other esters of bromoacetic acid, for example, the methyl, n-propyl, isopropyl, n-butyl, sec-butyl, tert-butyl, and benzyl esters whereby the corresponding 6,7-dihydro-4-thianaphtheneacetates and $\Delta^{4(5),\alpha}$-6,7-dihydrothianaphtheneacetates are obtained.

*Example 2.—Preparation of $\Delta^{4(5),\alpha}$-6,7-dihydrothianaphtheneacetic acid and 6,7-dihydro-4-thianaphtheneacetic acid*

A two-gram sample of the mixture of esters, prepared according to the procedure of Example 1, was heated with fifty milliliters of twenty percent sodium hydroxide solution until the organic layer disappeared and the solution was then acidified with hydrochloric acid. The precipitated acids were extracted with ether. Evaporation of the ether and recrystallization of the residue from glacial acetic acid yielded 1.4 grams (80 percent) of colorless acid, melting point 186–187 degrees centigrade.

*Analysis.*—Calculated for $C_{10}H_{10}O_2S$: C, 61.82; H, 5.19. Found: C, 61.79; H, 5.22.

Dilution of the acetic acid mother liquor with water deposited 200 milligrams (11 percent) of an isomeric acid in colorless needles, melting point 107–109 degrees centigrade.

*Analysis.*—Calculated for $C_{10}H_{10}O_2S$: C, 61.82; H, 5.19. Found: C, 61.81; H, 5.35.

These acids can be converted to 4-thianaphtheneacetic acid by dehydrogenation of the free acids, or their salts, esters, or amides, as more particularly set forth above, by the procedure of Example 3.

*Example 3.—Preparation of ethyl 4-thianaphtheneacetate*

A solution of twelve grams of mixed esters of Example 1 and 14.5 grams of chloranil in 100 milliliters of xylene was refluxed for 36 hours. The cooled solution was filtered and distilled under reduced pressure to yield 6.5 grams (55 percent) of ethyl 4-thianaphtheneacetate, boiling point 130 degrees centigrade at three millimeters.

This ester can be utilized as a plant-growth regulant or by hydrolysis can be converted to 4-thianaphtheneacetic acid.

By following the above procedure using, in place of the mixed esters of Example 1, the other esters listed following Example 1, there are obtained the methyl, n-propyl, isopropyl, n-butyl, sec-butyl, tert-butyl, and benzyl esters of 4-thianaphtheneacetic acid.

*Example 4.—Preparation of 4-thianaphtheneacetic acid*

The ethyl 4-thianaphtheneacetate of Example 3 was saponified and acidified by the procedure given in Example 2. There was obtained 4.1 grams (72 percent) of 4-thianaphtheneacetic acid which crystallized from water in colorless needles, melting point 146–146.5 degrees centigrade.

*Analysis.*—Calculated for $C_{10}H_8O_2S$: C, 62.47; H, 4.19. Found: C, 62.45; H, 4.35.

This acid can be utilized as a plant-growth regulant and as a substitute for 1-naphthaleneacetic acid, but with the advantage of having little or no formative activity. In extremely dilute aqueous solutions or dispersions, or other formulations well known in the agricultural art, the free acid, or its salts, esters, and amides can be used in the same applications for which correspondingly dilute formulations of 1-naphthaleneacetic acid are used.

*Example 5.—Preparation of the sulfone of 4-thianaphtheneacetic acid*

A mixture of 500 milligrams of 4-thianaphtheneacetic acid, three milliliters of glacial acetic acid, and 2.5 milliliters of thirty percent hydrogen peroxide was refluxed for fifteen minutes and then evaporated to dryness. Crystallization of the residue from water yielded 400 milligrams (70 percent) of the colorless sulfone of 4-thianaphtheneacetic acid, melting point 181 degrees centigrade.

*Analysis.*—Calculated for $C_{10}H_8O_4S$: C, 53.56; H, 3.59. Found: C, 53.35; H, 3.84.

By using a smaller amount, in the order of the stoichiometric amount, of hydrogen peroxide, the sulfoxide is obtained.

The sulfone and sulfoxide thus produced are also active as plant-growth regulants.

Following the procedure of Example 5, the $\Delta^{4(5),\alpha}$-6,7-dihydrothianaphtheneacetic acid and 6,7-dihydro-4-thianaphtheneacetic acid are converted to their corresponding sulfones and sulfoxides.

The several acids produced according to Examples 2 and 4 as well as their sulfones and sulfoxides can be converted to useful products by thiocyanoethylation. Thus the acid chlorides or bromides can be reacted with 2-thiocyanoethanol [Sergeev and Kolychev, J. Gen. Chem. (U.S.S.R.) 7: 1390–6 (1937); C.A. 32:2534 (1938)], to form 2-thiocyanoethyl $\Delta^{4(5),\alpha}$-6,7-dihydrothianaphtheneacetate, 2-thiocyanoethyl 6,7-dihydro-4-thianaphtheneacetate, and 2-thiocyanoethyl 4-thianaphtheneacetate and the sulfones and sulfoxides thereof, all of which are effective as contact insecticides. In suitable dusting powders and aqueous dispersions and like formulations well known in the agricultural art, they can be used in the like applications and formulations for which 2-thiocyanoethyl laurate and like known esters are commonly used.

*Example 6.—4-thianaphtheneacetyl chloride*

A mixture of 100 milliliters of thionyl chloride and 19.2 grams (0.1 mole) of 4-thianaphtheneacetic acid is refluxed until the evolution of hydrogen chloride and sulfur dioxide ceases. The excess thionyl chloride is removed by distillation, leaving crude 4-thianaphtheneacetyl chloride as a residue. The crude product can be used for reaction purposes, such as with alcohols, amines, and ammonia, to produce esters and amides, or if desired the crude can be purified by vacuum distillation.

By replacing the 4-thianaphtheneacetic acid in the above example, by the acids of Example 2, there are obtained 6,7-dihydro-4-thianaphtheneacetyl chloride and $\Delta^{4(5),\alpha}$-6,7-dihydro-4-thianaphtheneacetyl chloride. Also by substituting thionyl bromide for thionyl chloride there are obtained the corresponding acid bromides.

By reacting the above 4-thianaphtheneacetyl halides in an appropriate solvent, with gentle heating if necessary, with methanol, ethanol, n-propanol, isopropanol, n-butanol, sec-butanol, 3-methyl-1-butanol, 1-methyl-1-butanol, n-hexanol, 2-ethyl-1-hexanol, 2-methoxy-, 2-ethoxy-, 2-butoxy-, 2-(2-butoxyethoxy), and 2-(2-ethoxyethoxy)-ethanols, benzyl alcohol, methylamine, ethylamine, n-propylamine, isopropylamine, n-butylamine, sec-butylamine, 3-methyl-1-butylamine, 1-methyl-1-butylamine, n-hexylamine, 2-ethyl-1-hexylamine, 2-methoxy-, 2-ethoxy-, 2-butoxy-, 2-(2-butoxyethoxy)- and 2-(2-ethoxyethoxy)-ethylamines, and benzylamine, as well as dimethylamine, diethylamine, di-n-propylamine, diisopropylamine, N-methyl-n-propylamine, piperidine, pipecolines, morpholine, pyrrolidine, ethanolamine, diethanolamine, tris(hydroxymethyl)methylamine, bis[tris(hydroxymethyl)methyl]amine, 2-amino-1-butanol, 2-amino-2-ethyl-1,3-propanediol, 2-amino-2-methyl-1-propanol, ethylene glycol, 2-thiocyanoethanol, ethylenediamine, and the like, there are obtained the corresponding esters and secondary and tertiary amides.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. The process which comprises converting 6,7-dihydro-4(5)-thianaphthenone by means of a Reformatzky reaction with a haloacetic acid ester in the presence of zinc to a mixture of the corresponding esters of 6,7-dihydro-4-thianaphtheneacetic acid and $\Delta^{4(5),\alpha}$-6,7-dihydrothianaphtheneacetic acid.

2. The process which comprises converting 6,7-dihydro-4(5)-thianaphthenone by means of a Reformatzky reaction with a haloacetic acid ester in the presence of zinc to a mixture of the corresponding esters of 6,7-dihydro-4-thianaphtheneacetic acid and $\Delta^{4(5),\alpha}$-6,7-dihydrothianaphtheneacetic acid and dehydrogenating said mixture to the corresponding ester of 4-thianaphtheneacetic acid.

3. The process which comprises converting 6,7-dihydro-4(5)-thianaphthenone by means of a Reformatzky reaction with a haloacetic acid ester in the presence of zinc to a mixture of the corresponding esters of 6,7-dihydro-4-thianaphtheneacetic acid and $\Delta^{4(5),\alpha}$-6,7-dihydrothianaphtheneacetic acid, dehydrogenating said mixture, and hydrolyzing the resulting ester of 4-thianaphtheneacetic acid to produce free 4-thianaphtheneacetic acid.

4. The process which comprises converting 6,7-dihydro-4(5)-thianaphthenone by means of a Reformatzky reaction with a haloacetic acid ester in the presence of zinc to a mixture of the corresponding esters of 6,7-dihydro-4-thianaphtheneacetic acid and $\Delta^{4(5),\alpha}$-6,7-dihydrothianaphtheneacetic acid and hydrolyzing the esters of said mixture to their respective acids.

5. A compound selected from the class consisting of compounds having the general formula:

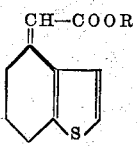

and the sulfones and sulfoxides thereof in which R is selected from the class consisting of hydrogen, lower hydrocarbon radicals and lower alkoxyalkyl radicals.

6. A compound having the formula:

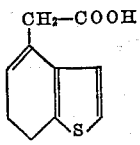

7. A compound having the formula:

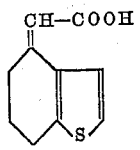

8. A compound having the formula:

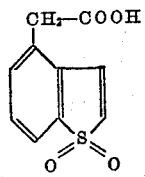

9. 4-thianaphtheneacetic acid.
10. Ethyl 4-thianaphtheneacetate.
11. Sodium 4-thianaphtheneacetate.
12. Ethyl $\Delta^{4(5),\alpha}$-6,7-dihydrothianaphtheneacetate.
13. Sodium $\Delta^{4(5),\alpha}$-6,7-dihydrothianaphtheneacetate.
14. Ethyl 6,7-dihydro-4-thianaphtheneacetate.
15. Sodium 6,7-dihydro-4-thianaphtheneacetate.
16. A process which comprises heating a compound selected from the group consisting of:

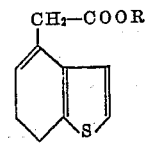

and

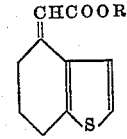

wherein R is selected from the group consisting of hydrogen, lower hydrocarbon radicals, and lower alkoxyalkyl radicals with a dehydrogenation agent to form a compound having the formula:

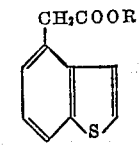

wherein R is as specified above.

17. A process which comprises reacting a compound having the formula:

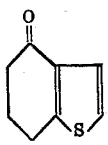

with a haloacetic acid having the formula:

$$XCH_2COOR'$$

wherein X is halogen and R' is selected from the group consisting of lower hydrocarbon radicals and lower alkoxyalkyl radicals in the presence of zinc in a Reformatzky reaction, heating a compound selected from the group consisting of the product obtained, in said Reformatzky reaction and the free acid thereof with a dehydrogenating agent to form a compound having the formula:

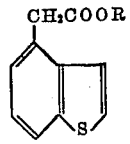

wherein R is selected from the group consisting of hydrogen, lower hydrocarbon radicals, and lower alkoxyalkyl radicals.

18. A member selected from the group consisting of compounds having the general formula:

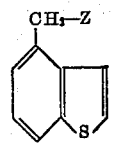

and the sulfones and sulfoxides thereof in which Z is selected from the class consisting of —COOR,

—CONR'R"

—COOM, —COOAm, and —COX wherein R is selected from the group consisting of hydrogen, lower-hydrocarbon radicals, and lower-alkoxyalkyl radicals; R' and R" are selected from the group consisting of hydrogen, lower-hydrocarbon radicals, lower-alkoxyalkyl radicals, lower-hydroxyalkyl radicals, and groups forming with the nitrogen atom a ring selected from the group consisting of piperidine, pipecoline, morpholine and pyrrolidine; M is a metal cation; Am is an ammonium cation; and X is halogen.

References Cited in the file of this patent

UNITED STATES PATENTS 1,913,484   Haller _____ June 13, 1933

OTHER REFERENCES

Horning: Organic Synthesis, vol. 3, p. 408.
Blicke: J.A.C.S., 70: 3768–70 (1948).
Crooke et al.: Nature, vol. 139, pp. 154–5 (1937).